United States Patent

Fitzsimons et al.

[15] 3,647,016
[45] Mar. 7, 1972

[54] VEHICLE SPEED RESPONSIVE SYSTEM

[72] Inventors: William D. Fitzsimons, Garden City; Bernard G. Radin, Oak Park, both of Mich.

[73] Assignee: Ford Motor Company, Dearborn, Mich.

[22] Filed: Aug. 28, 1969

[21] Appl. No.: 853,904

[52] U.S. Cl. .................. 180/105 R, 123/102, 123/117 R
[51] Int. Cl. ............................................................ B60k 13/00
[58] Field of Search .............. 180/82, 105, 103; 123/97, 102, 123/117, 119; 317/DIG. 5; 340/263, 264; 310/168, 156 PM, 257, 164, 162

[56] References Cited

UNITED STATES PATENTS

| | | | |
|---|---|---|---|
| 2,951,957 | 9/1960 | Eigeman | 310/164 |
| 3,504,208 | 3/1970 | Rivers | 310/257 X |
| 3,581,839 | 6/1971 | Carp | 180/82 |
| 3,455,411 | 7/1969 | Carp et al. | 123/102 X |
| 3,517,260 | 6/1970 | Oishi | 123/102 |
| 3,555,323 | 1/1971 | Gerber | 310/156 |
| 3,027,884 | 4/1962 | Bale et al. | 123/97 |
| 3,041,469 | 6/1962 | Ross | 317/DIG. 5 |
| 3,272,191 | 9/1966 | Walker | 123/117 |
| 3,406,775 | 10/1968 | Magnuski | 123/102 X |

*Primary Examiner*—Kenneth H. Betts
*Attorney*—John R. Faulkner and Glenn S. Arendsen

[57] ABSTRACT

A signal generator connected mechanically to a vehicle wheel is coupled to electronic circuitry that actuates an item of vehicle equipment when a predetermined vehicle speed is attained. The system can be used to control ignition-timing, throttle-blade-positioning, exhaust-gas-recirculating, door-locking, speed-warning or speed-limiting equipment. The electronic circuitry is coupled to individual actuators that connect or disconnect power sources to the vehicle equipment when vehicle speed has attained predetermined values.

4 Claims, 4 Drawing Figures

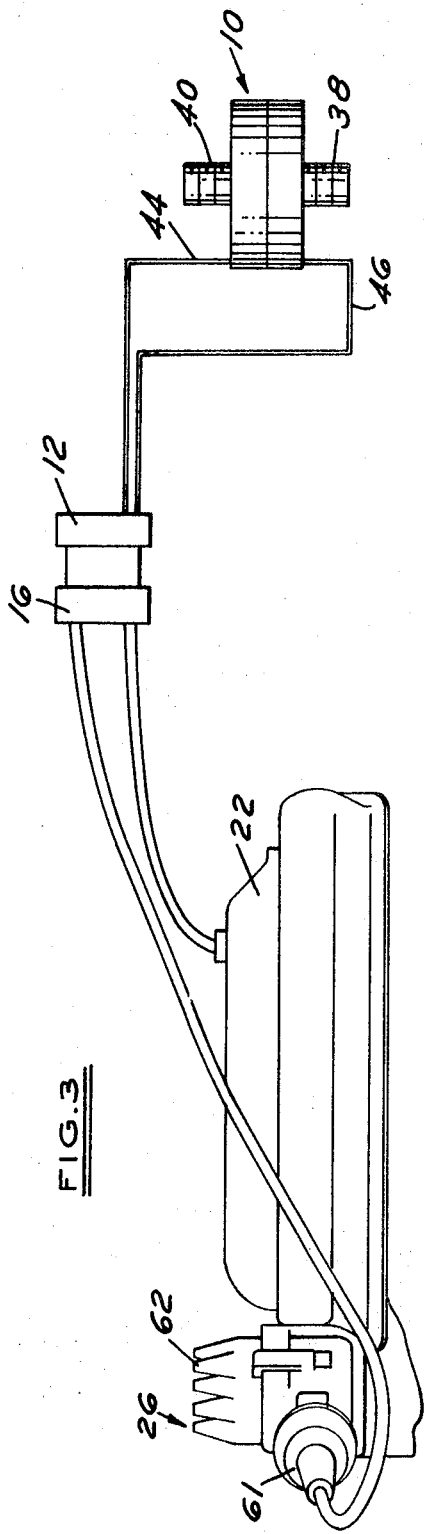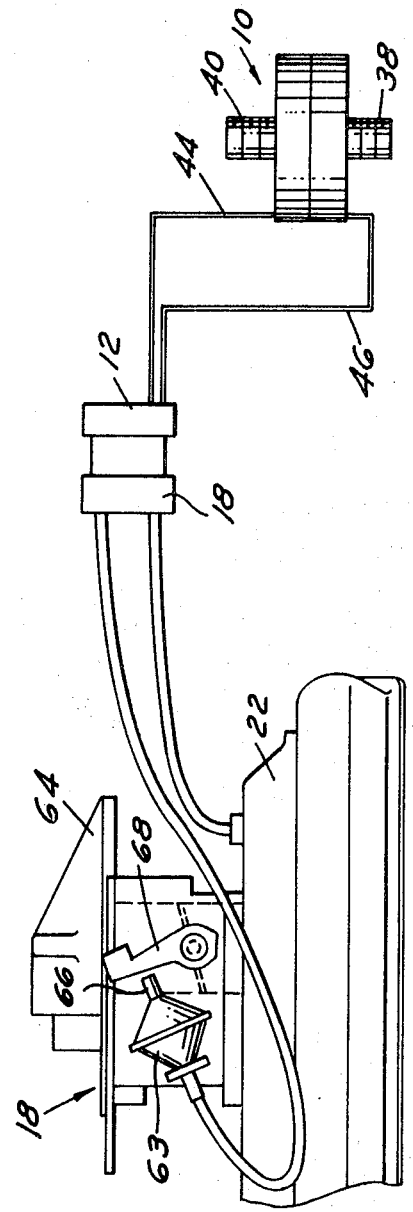

VEHICLE SPEED RESPONSIVE SYSTEM

BACKGROUND OF THE INVENTION

Legislated exhaust emission standards have necessitated the use of various vehicle equipment that is actuated at predetermined vehicle speeds. Thus ignition timing equipment that advances or retards ignition timing according to vehicle speed beyond those modifications obtainable by ordinary manifold pressure and centrifugal mechanisms has been incorporated into many modern engines. Other systems that position the throttle blade or permit recirculation of exhaust gases according to vehicle speed also are being considered. In addition to such emission control equipment, systems designed to improve the safety or convenience of the passengers by locking the vehicle doors above a predetermined vehicle speed, actuating speed warning lights, or limiting maximum vehicle speed are in use or under consideration.

Equipment dealing with engine functions typically has obtained its actuating signal from the intake manifold pressure of the engine or from centrifugal mechanisms responding to engine speed. These parameters are somewhat representative of vehicle speed in a limited range of operating conditions but produce considerable inaccuracies during overall vehicle operation. More stringent emission control necessitates increased overall accuracy of such engine equipment, and greater accuracy also is desirable for the proposed safety and convenience equipment.

SUMMARY OF THE INVENTION

This invention provides a system for controlling one or more items of vehicle equipment as a function of vehicle speed. The system comprises an electrical signal generator connected mechanically to a vehicle wheel so wheel rotation drives the generator to produce an alternating signal having a frequency representative of vehicle speed. An electronic converter coupled to the output terminals of the signal generator converts the alternating signal from the signal generator into a voltage that is proportional to vehicle speed. The output voltage of the converter is applied to a plurality of actuators that are triggered when the voltage exceeds some predetermined value. Each actuator controls the application of a power source to an item of vehicle equipment to activate or deactivate the vehicle equipment. The power source can be the vehicle battery, the intake manifold vacuum of the vehicle engine, fluid pressure taken from the engine-lubricating system or the transmission, rotating engine components, etc.

Each actuator can be set to operate at a different predetermined voltage so that the system performs a multiplicity of functions at different vehicle speeds. An actuator can either connect or disconnect a power source to the vehicle equipment at its predetermined speed, and the term "actuate" is used herein to identify each of these operations. Emission control devices such as ignition-timing, throttle-blade-positioning, and exhaust-gas-recirculating equipment or safety and convenience systems such as door-locking, speed-warning or speed-limiting devices can be included in the system.

A small alternator connected into the conventional speedometer cable, which in turn is connected to a driving wheel of the vehicle, can be used as the signal generator. The alternator comprises a permanent magnet rotor mounted inside an annular bobbin containing a stator winding. Ferromagnetic pole pieces snap onto each side of the bobbin and have projecting fingers that mesh with each other to form spaced sets of poles on the radially inner surface of the bobbin. Rotor rotation thus produces an alternating signal at the output terminals of the stator winding that has a frequency proportional to rotor speed.

BRIEF DESCRIPTION OF THE DRAWINGS

FIG. 3 is an equipment layout of the equipment used in the system of this invention to control engine ignition timing.

FIG. 4 is a layout of the equipment used in the system of this invention to control the closed position of the throttle blade.

DETAILED DESCRIPTION

Figure 1:
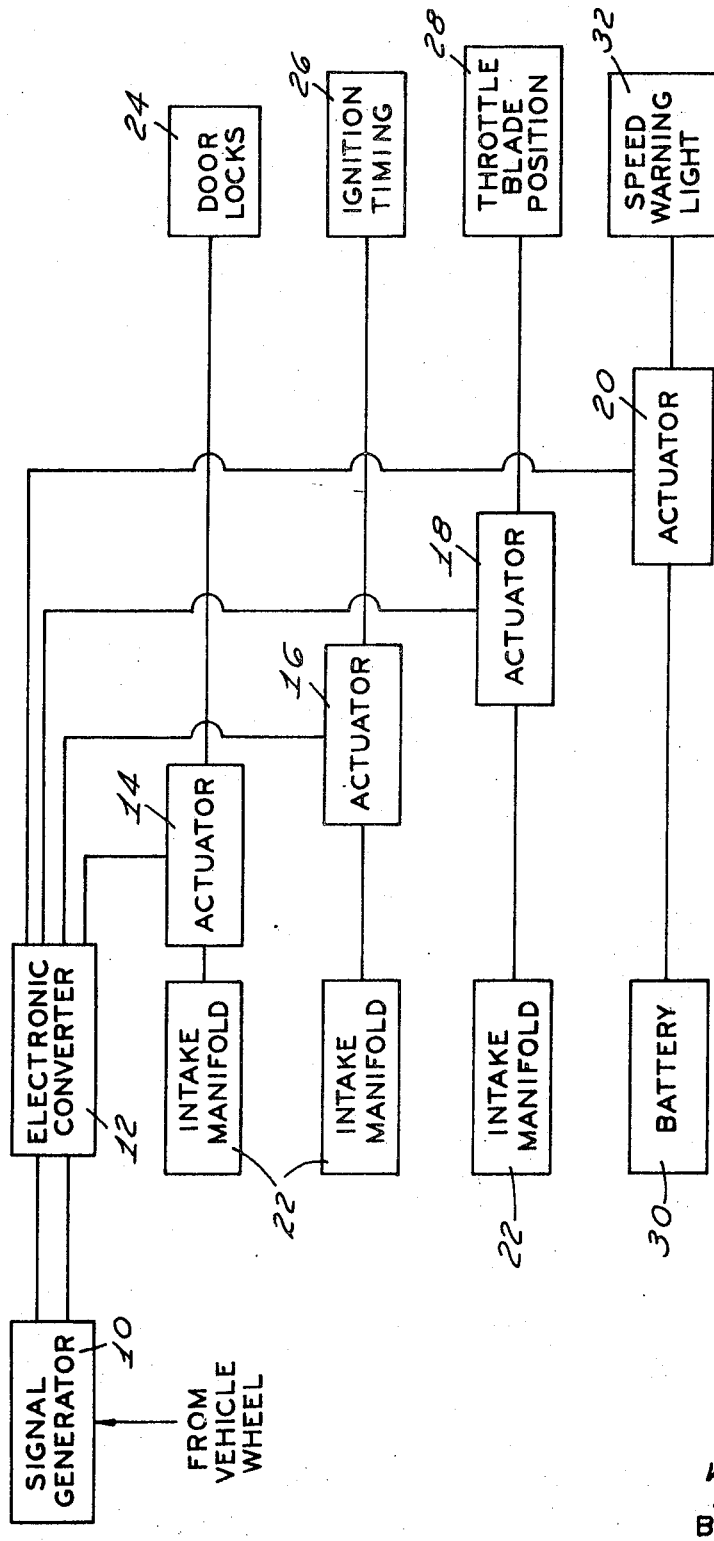
FIG. 1 is a schematic of the system of this invention in which the output of an electronic converter is applied to four individual actuators.

Referring to FIG. 1, an electronic converter 12 is connected to the output leads of a signal generator 10. The electronic converter can be any conventional frequency to voltage converter circuit, but preferably is the temperature and voltage compensated circuit described in copending U.S. patent application Bozoian Ser. No. 853,905 filed Aug. 28, 1969 entitled Electronic Circuitry For Vehicle Speed Responsive System. This copending application is assigned to the assignee of the instant application and the entire disclosure thereof is incorporated herein.

Converter 12 produces an output voltage that is representative of the vehicle speed, and this output voltage is applied to a plurality of actuators 14, 16, 18 and 20. Each actuator contains a voltage sensitive switch circuit that is preset for actuation at some predetermined voltage. A typical switch circuit can be a conventional Schmitt trigger. Actuator circuits shown in the Bozoian application mentioned above are preferred because of the high accuracy thereof.

Actuator 14 contains a solenoid valve controlling the application of the engine intake manifold 22 to a vacuum system that is connected to the vehicle door lock 24. When vehicle speed exceeds some relatively low value such as 8–10 m.p.h., actuator 14 applies the intake manifold vacuum to door lock mechanism 24 to lock the doors of the vehicle. The actuator generally does not unlock the doors when vehicle speed declines below the predetermined value and permits manual unlocking at any vehicle speed.

Actuator 16 connects the engine intake manifold 22 to an ignition timing mechanism 26, and actuator 18 connects intake manifold 22 to a throttle-blade-positioning mechanism 28. FIGS. 3 and 4 show the equipment used in the ignition-timing and throttle-blade-positioning systems, which are described in more detail below.

Actuator 20 connects the vehicle battery 30 to a speed-warning light 32 that typically is mounted on the vehicle instrument panel. When vehicle speed reaches some value preset by either the driver or the automobile manufacturer, actuator 20 couples the battery to the speed-warning light. In a typical installation, the speed-warning light is turned on when vehicle speed exceeds abut 70 m.p.h. A mechanism can be included to adjust the set point of the warning light to local conditions; for example, the light could be adjusted to turn on at about 25–30 m.p.h. for residential or city driving.

Figure 2:
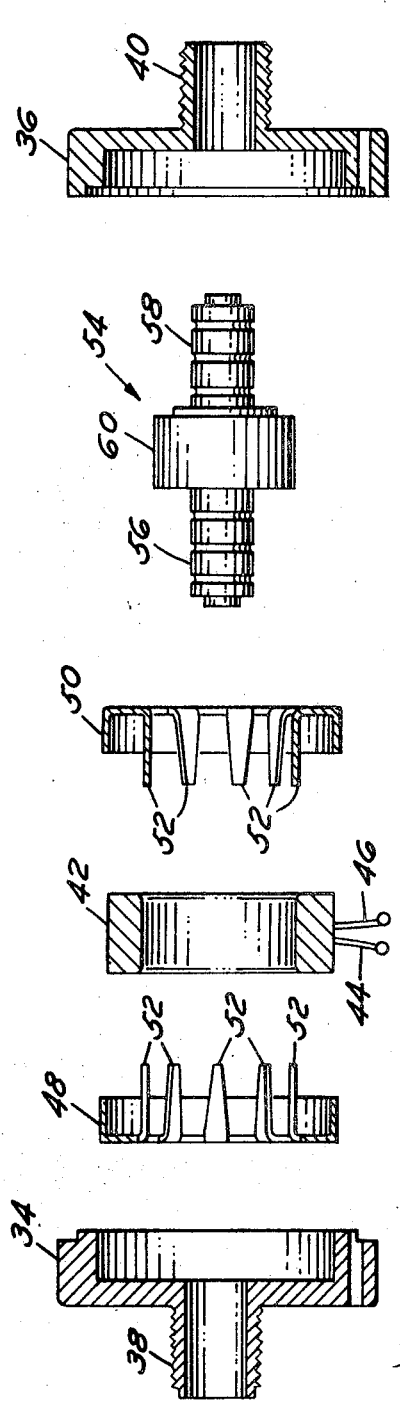
FIG. 2 is an exploded view of an alternator useful as the signal generator.

Turning to FIG. 2, a signal generator useful in this invention comprises two housing halves 34 and 36. Each housing half has an exterior ferrule 38 and 40, and each ferrule is threaded for connection to the conventional vehicle speedometer cable (not shown). An annular bobbin 42 adapted for location within housing halves 34 and 36 comprises a winding encapsulated in a polymeric material. The winding leads 44 and 46 are brought outside the assembled housing halves through appropriate holes (not shown). A pair of pole pieces 48 and 50 are shaped to fit over the axial ends of bobbin 42. Each pole piece has a plurality of inwardly projecting fingers 52 that fit against the inner cylindrical surface of bobbin 42 where the fingers form a plurality of sets of spaced poles. The pole pieces are made of a ferromagnetic material such as cold rolled steel.

A rotor 54 has cylindrical bearing portions 56 and 58 on each side of a permanent magnet portion 60. The bearing portions are located within the passages formed in ferrules 38 and 40 and the permanent magnet portion is located within bobbin 42 when the signal generator is assembled. Magnet portion 60 preferably is made of a ceramic material that has been magnetized to form a plurality of poles on its exterior surface. Bearing portions 56 and 58 typically are made of a polymeric material that is injection molded into the magnet portion. In a typical signal generator, the magnet portion 36 is about 1 inch in diameter and contains about 16 poles equally spaced around its cylindrical surface.

Turning to the ignition timing control system shown in FIG. 3, the signal generator 10 is connected to a unit containing an electronic converter 12, and the output of converter 12 is connected to an actuator 16. Actuator 16 includes a solenoid valve that connects the engine intake manifold 22 to ignition-timing equipment 26 that comprises a vacuum motor 61 attached to an ignition distributor 62. Depending on particular engine parameters, the system can apply intake manifold vacuum to the vacuum motor 26, which in turn modifies ignition timing, either above or below any predetermined speed. In place of the intake manifold vacuum power source, the system can be used to connect the conventional carburetor spark port with the ignition-timing vacuum motor 61.

Turning now to the throttle-blade-positioning system of FIG. 4, signal generator 10 again is connected to electronic converter 12, which in turn is connected to an actuator 18. Actuator 18 also contains a solenoid valve that connects the engine intake manifold 22 to a throttle-blade-positioning mechanism comprising a vacuum motor 63 mounted on the engine carburetor 64. The movable rod 66 of vacuum motor 63 is positioned adjacent a lever 68 fastened to the carburetor throttle blade rod. When intake manifold vacuum is applied by actuator 18 to vacuum motor 63, rod 66 is extended to a position that permits the throttle blade return spring (not shown) to move the throttle blade to a slightly open position only. When actuator 18 blocks intake manifold vacuum from vacuum motor 63, rod 66 is retracted to permit the throttle return spring to move the throttle blade to its normal idling position. Actuator 18 typically is actuated at about 20 m.p.h. and performs an emission control function.

Thus this invention provides a system for controlling various items of vehicle equipment according to vehicle speed. Numerous components of the system can be used to control various items of equipment at various vehicle speeds in accordance with the vehicle designer's wishes from a single signal generator and converter.

What is claimed is:

1. A system for actuating an exhaust emission control device in an automotive vehicle as a function of vehicle speed comprising an electrical signal generator connected mechanically to a vehicle wheel, said signal generator including a rotor having a cylindrical permanent magnet connected to said vehicle wheel for producing a rotating magnetic field according to the rotation of said vehicle wheel, a winding located radially outward of said rotor and a pair of ferromagnetic pole pieces fitting on opposite axial sides of the winding, each of said pole pieces having fingers projecting axially between the outer periphery of the rotor and the inner surface of the winding, said winding intersecting said rotating magnetic field and having an alternating electrical signal induced therein by said rotating magnetic field, electronic means coupled to said winding, said electronic means producing an output signal when the frequency of the signal produced in the winding reaches a predetermined frequency, and actuating means coupled to said electronic means for controlling the application of a power source to said exhaust emission control device to actuate said device when said electronic means produces an output signal.

2. The system of claim 1 in which the power source is engine intake manifold vacuum and the actuating means is an electrical solenoid controlling the application of said manifold vacuum to said vehicle equipment.

3. The system of claim 2 in which the vehicle equipment comprises means for preventing complete closing of the throttle blade of the vehicle engine whenever vehicle speed exceeds a predetermined amount.

4. The system of claim 1 in which the vehicle equipment comprises means for preventing complete closing of the throttle blade of the vehicle engine whenever vehicle speed exceeds a predetermined amount.

* * * * *